United States Patent [19]

Richard

[11] 3,842,529
[45] Oct. 22, 1974

[54] DELAYED BAIT DISPENSER

[76] Inventor: Joseph D. Richard, 3613 Loquat Ave., Miami, Fla. 33133

[22] Filed: Aug. 20, 1973

[21] Appl. No.: 389,707

[52] U.S. Cl. .................................. 43/44.99, 43/100
[51] Int. Cl. ............................................ A01k 97/02
[58] Field of Search ........................... 43/44.99, 100

[56] References Cited
UNITED STATES PATENTS

| | | | |
|---|---|---|---|
| 3,176,427 | 4/1965 | Hershey | 43/44.99 X |
| 3,426,472 | 2/1969 | Richard | 43/100 |
| 3,654,725 | 4/1972 | Kingston | 43/44.99 |
| 3,724,120 | 4/1973 | Richard | 43/100 |

*Primary Examiner*—Antonio F. Guida
*Assistant Examiner*—Daniel J. Leach

[57] ABSTRACT

A container for dispensing natural or artificial baits in aquatic animal traps after a suitable delay interval following submersion in seawater. In the bait dispenser, temporary containment of the bait is effected by an anodic closure member which eventually disintegrates through galvanic corrosion after a predetermined time interval, thus releasing the bait.

8 Claims, 8 Drawing Figures

PATENTED OCT 22 1974　　3,842,529
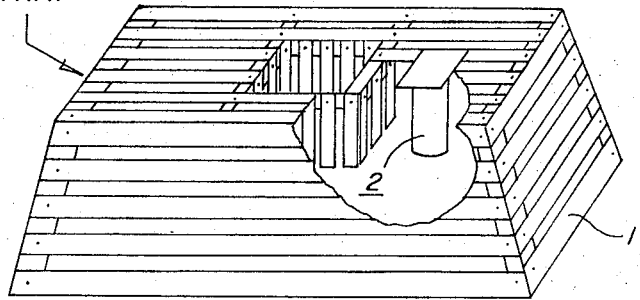
FIG. 1
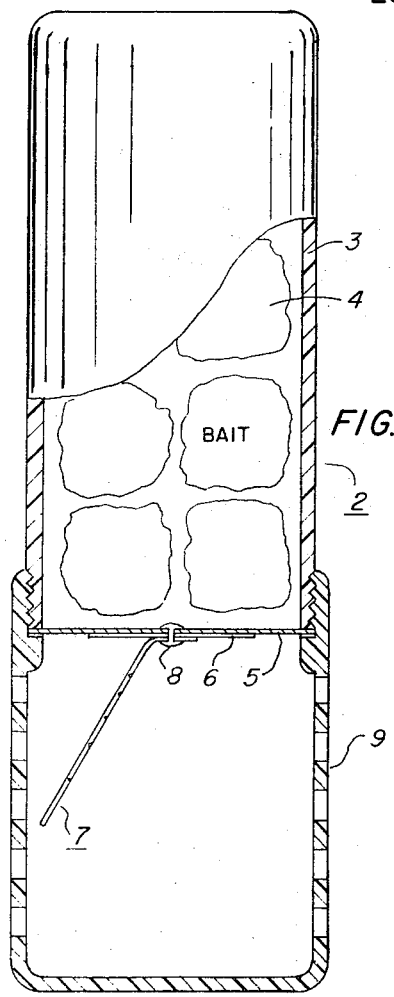
FIG. 2a
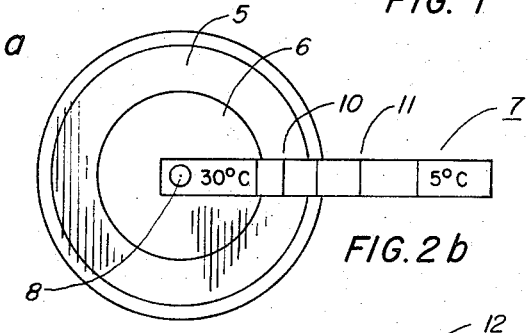
FIG. 2b
| EXPOSED ANNULAR ANODE | | | | BAIT RELEASE TIME, HRS. |
|---|---|---|---|---|
| O.D. | I.D. | THICKNESS | VOLUME | |
| 7.5 | 6.87 | .025 cm. | .213 | 12 |
| 7.5 | 5.00 | .025 | .656 | 36 |
| 7.5 | 5.62 | .050 | 1.11 | 60 |
| 7.5 | 4.37 | .050 | 1.54 | 84 |
FIG. 3
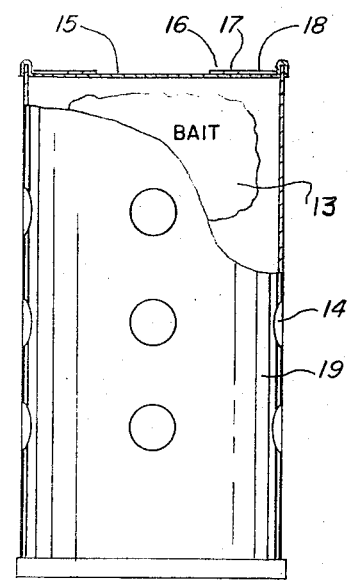
FIG. 4
FIG. 5
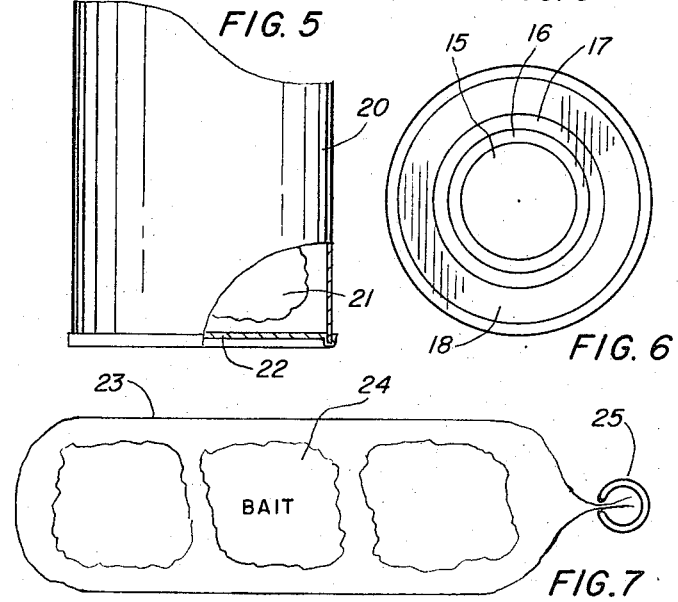
FIG. 6
FIG. 7

DELAYED BAIT DISPENSER

BACKGROUND OF THE INVENTION

Generally, crustaceans, such as lobsters and crabs, are caught with baited traps. They are attracted to such traps by the odor of the bait which usually comprises a food substance preferred by the particular animal being sought. Manufactured baits are sometimes used because they have the important advantage of not requiring refrigerated storage before use. Unfortunately, after baits are immersed in water, the attractive odor substances leach out rapidly and, for this reason, the effectiveness of baited traps extends only for a relatively short period after the trap is set. As a consequence, much of the effort and expense of trap fishing involves the frequent renewal of bait. Generally, re-baiting is necessary long before an adequate catch has accumulated and it has been recognized, therefore, that if bait renewal can be effected without the expenditure of labor and boat operating time, the actual catch per unit effort, and hence the profitability, of the fishing operation can be significantly increased.

SUMMARY OF THE INVENTION

The present invention provides a method and apparatus for dispensing a bait within a trap after a predetermined period of time after submersion. Various types of baits can be accommodated within the bait dispenser described herein including both conventional baits, such as fish scraps and the like, and manufactured or processed baits. Closure of the bait container is effected with a corrodible metal element which comprises the anodic member of a galvanic couple. The delay time before bait release is determined by the volume of the anode member which has to be depleted before the container is opened, and also by the exposed surface area of the cathodic member of the couple.

DESCRIPTION OF THE DRAWINGS

FIG. 1 shows a lobster trap containing a delayed bait dispenser according to the present invention.

FIG. 2a shows a sectional view of a delayed bait dispenser according to the present invention in which a re-usable container is closed with an expendable disk. The disk comprises the anodic member of a galvanic couple.

FIG. 2b shows the expendable anodic disk used to close the bait container of FIG. 2a. The volume of the exposed anode and the surface area of the cathodic strip jointly determine the delay time before the bait is released.

FIG. 3 shows the exposed annulus dimensions and consequent anode volumes which correspond to several typical bait release times for the expendable disk configuration shown in FIG. 2b.

FIG. 4 shows a delayed bait dispenser comprising a sealed anodic metal can partially covered with a protective coating. Corrosion and eventual perforation of the can is confined to the exposed areas. The top of the can is cathodic and partly covered by a peelable plastic coating to allow variation in the area exposed.

FIG. 5 shows a metal can containing bait sealed on one end by an anodic cap and on the other end by a cathodic cap.

FIG. 6 shows a cathodic cap suitable for the sealed bait containers of FIGS. 4 and 5. The center of the cap is exposed and the area of exposed cathode can be increased by peeling off the adjacent annular rings.

FIG. 7 shows a flexible plastic bait bag held closed by a corrodible clip.

DESCRIPTION OF THE PREFERRED EMBODIMENT

In FIG. 1, a lobster trap 1 is shown containing a delayed bait dispenser 2 according to the present invention.

In FIG. 2a, a container 3 is shown wherein the bait 4 is enclosed with an expendable magnesium alloy disk cover 5. The disk cover 5 is held in place by the perforated catch basket 9 which is threaded to the container 3. A nickel plated cathodic strip 7 is attached to the disk 5 with the rivet 8. A plastic coating 6 covers part of the disk cover leaving an exposed annular section on the disk cover 5. The anodic disk 5, of a suitable magnesium alloy such as AZ31B, and the nickel plated cathode strip 7 together comprise a galvanic couple characterized by the rapid corrosion of the exposed anodic portion when the couple is immersed in seawater. When the exposed annular section of the disk cover 5 disintegrates, the bait 4 is released into the catch basket 9.

FIG. 2b shows in detail the anodic disk cover 5 to which is attached the cathodic strip 7 by means of the rivet 8. The width of the exposed annulus of the disk cover 5, the thickness of the disk cover 5, and the surface area of the cathodic strip 7 all determine the delay time before bait release. The corrosion rate of the anodic section of the galvanic couple, such as shown in FIG. 2b, depends on the conductivity of seawater. For purposes of the present invention, water temperature is the most important variable affecting seawater conductivity. The corrosion rate of the exposed portion of the disk cover 5 can be adjusted for a particular water temperature by trimming the length of the cathodic strip 7. For example, if the water temperature is about 5° C, the entire strip would be left intact. Crimps are provided to facilitate cutting or breaking to accommodate warmer temperatures. For example, the cathode strip 7 should be cut at the crimp 11 for water temperature of 15° C or at the crimp 10 for water of 25° C. Plastic coating prevents corrosion of the center portion 6 of the anodic disk cover.

FIG. 3 shows the dimensions of the anodic disk cover to obtain bait release times of 12, 36, 60, and 84 hours. The volume of the exposed annular anode corresponding to a particular bait release time is obtained by a suitable combination of exposed annulus width and disk thickness.

FIG. 4 shows a sealed can 19 containing a bait substance 13. The body of the can 19 is of a suitable magnesium alloy to allow rapid galvanic corrosion when coupled to a cathodic surface. The side of the sealed can 19 is covered with a protective coating except for a series of bare areas where the magnesium is exposed, such as the exposed magnesium area 14. Corrosion and subsequent perforation of the magnesium alloy can 19 is confined to those exposed areas. The top of the sealed can is nickel plated and at least partly exposed to provide a cathode surface 15. The outer periphery of the top is covered with a peelable plastic coating 16, 17, and 18 in concentric rings which can be removed to expose larger areas of cathodic surface to accommodate a range of seawater temperatures.

FIG. 5 shows an alternative construction for a sealed can delayed bait dispenser in which a magnesium alloy bottom 22 is fitted to an aluminum can 20 containing a bait substance 21. When coupled to a cathodic top and immersed in seawater, the anodic magnesium alloy bottom 22 will disintegrate after a period of time to release the bait 21. The bait release time can be reduced and varied by confining the exposed portion of the anodic can bottom 22 to an annular ring as described in FIG. 2b. In addition, the area of exposed cathodic surface can also be changed to vary the bait release time as in FIG. 4.

As an alternative, the disintegration of the bottom of the bait container of FIG. 5 can be effected by the use of a magnesium-nickel alloy for the bottom 22 to obviate the need for a cathodic top. For example, if a magnesium alloy containing about 4 percent nickel is used for the bottom 22, it will disintegrate after about 12 hours of immersion in seawater. Longer delays are obtained by the use of alloys containing lower percentages of nickel.

FIG. 6 shows a nickel plated cathodic top for the sealed can delayed bait dispensers of FIGS. 4 and 5. The exposed cathode surface 15 can be increased in stages by peeling off concentric rings 16 and 17 of plastic coating. For example, if the area of the exposed cathode 15 is suitable for a water temperature of 30°C, then the concentric ring of plastic coating 16 should be peeled off to accommodate a water temperature of 20° C. Both rings 16 and 17 should be peeled off to accommodate a water temperature of 10° C.

FIG. 7 shows a flexible plastic bag 23 containing a bait substance 24 held closed by a magnesium alloy clip 25. The clip 25 is composed of a magnesium-nickel alloy so that a separate cathode is not required. The corrosion rate of the clip increases according to the percentage of nickel in the alloy. For example, a 12 hour disintegration time is provided by an alloy having about 4 percent nickel. Longer delay times are obtained with alloys having less nickel. As an alternative to the magnesium-nickel alloy clip 25, a magnesium alloy clip could be used with an attached cathode section analogous to that shown in FIG. 2b.

Obviously, there are many possible variations in the construction and operation of the delayed bait dispenser described herein. Although a combination of nickel and magnesium has been found to provide suitable delay periods for the bait dispenser, other metals could be used so long as an adequate potential difference is provided by the galvanic couple. For example, aluminum would be a suitable alternative for the anodic member of the couple when relatively longer delay periods are required. Copper would be a suitable alternative for the cathodic member of the couple. However, the magnesium alloy AZ31B has been found to be a suitable anodic material for purposes of the present invention, and nickel plating is a suitable cathodic material.

From FIGS. 2b and 6, it can be seen that the delay period for the bait dispenser can be adjusted by varying either the exposed anode volume or the exposed cathode area. The delay time is increased by increasing the exposed anode volume or by decreasing the exposed cathode area. The variable area cathodes of FIGS. 2b and 6 are shown as a means for adjusting for extreme temperature variations. The corrosion rate of the anode is increased by increasing the cathode surface area and this can be used to compensate for the effects of colder water.

As an alternative to the cathodic strip 7 shown in FIG. 2b, a cathodic disk could be used, riveted or welded concentrically onto the anodic disk cover 5. As another alternative, an area of nickel plating can be applied directly onto the magnesium substrate to provide a cathodic surface. However, if a particular disk cover is to provide a reasonably accurate delay time over a wide range of water temperatures, some means must be provided for adjusting the area of exposed cathode accordingly, such as shown in FIG. 2b.

The catch basket 9 shown in FIG. 2a prevents the released bait from being washed away by currents but is otherwise not necessary. Under some fishing conditions, the trapped crustaceans should have access to the released bait as they would otherwise become excessively hungry and more likely to escape from the trap. This is particularly important when two or three delayed bait dispensers are used in the same trap, e.g., to effect re-baiting at delay intervals of 12, 36, and 60 hours. As many crustaceans feed at night, there is considerable advantage in selecting delay periods which effect bait release during the night or early evening.

It is understood that various other modifications are possible and the invention is not limited to the specific embodiments disclosed, nor otherwise, except as set forth in the following claims.

What is claimed is:

1. A dispenser for releasing bait in a submerged trap after a predetermined time interval comprising:
   a container for enclosing a bait substance;
   a metallic anode member comprising at least a portion of the said container, said anode member having at least a partially exposed surface and a substantially high galvanic activity when immersed in seawater;
   a metallic cathode member attached to the said container and electrically coupled to the said anode member, said cathode member having at least a partially exposed surface which is relatively noble galvanically when immersed in seawater, said anode and cathode members thus comprising a galvanic couple characterized by the relatively rapid disintegration of the said anode member so that the said container becomes open after a predetermined period of immersion in seawater.

2. Apparatus as described in claim 1 wherein said anode member comprises an expendable lid for temporarily sealing a re-usable bait container; and the said cathode member is coupled directly onto the said expendable lid.

3. Apparatus as described in claim 1 wherein the said container comprises a sealed can and said anode member comprises at least a portion of the body of the said sealed can.

4. Apparatus as described in claim 1 wherein the said container comprises a sealed can; said anode member comprises a magnesium alloy bottom of the said sealed can; and the said cathode member comprises an exposed portion of a nickel plated top of the said sealed can.

5. Apparatus as described in claim 1 wherein the exposed surface area of the said cathode member can be adjusted to vary the corrosion rate of the said anode member.

6. Apparatus as described in claim 1 wherein the said anode member is composed of a magnesium alloy, and the said cathode member comprises a nickel powder dispersed in and alloyed with the said magnesium alloy.

7. Apparatus as described in claim 1 wherein said container is a flexible bag, and said anode member comprises a magnesium alloy clip for securing one end of the said bag.

8. The method of re-baiting fish traps or the like after a predetermined period of immersion in seawater comprising: enclosing a bait substance in a container at least part of which consists of a metal anode member having substantially high galvanic activity when immersed in seawater, to which is electrically connected a metal cathode member having a relatively low galvanic activity when immersed in seawater, said anode and cathode members thus comprising a galvanic couple characterized by the relatively rapid corrosion of the said anode member so that the said container becomes open after a predetermined period of immersion in seawater.

* * * * *